(12) United States Patent
Chen et al.

(10) Patent No.: US 10,313,429 B2
(45) Date of Patent: Jun. 4, 2019

(54) DISTRIBUTED RESOURCE MANAGEMENT METHOD AND SYSTEM

(71) Applicant: Huawei Technologies Co., Ltd, Shenzhen, Guangdong (CN)

(72) Inventors: Jin Chen, Thornhill (CA); Lei Guo, Markham (CA); Chong Chen, Richmond Hill (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 131 days.

(21) Appl. No.: 15/095,822

(22) Filed: Apr. 11, 2016

(65) Prior Publication Data
US 2017/0295220 A1    Oct. 12, 2017

(51) Int. Cl.
*G06F 9/455* (2018.01)
*H04L 29/08* (2006.01)

(52) U.S. Cl.
CPC .................. *H04L 67/10* (2013.01)

(58) Field of Classification Search
CPC .................................. G06F 9/45533
USPC .......................................... 718/1
See application file for complete search history.

(56) References Cited

U.S. PATENT DOCUMENTS

| | | | |
|---|---|---|---|
| 8,706,798 B1 * | 4/2014 | Suchter ................. | G06F 9/5038 709/202 |
| 8,954,584 B1 * | 2/2015 | Subbarayan .......... | H04L 47/765 709/201 |
| 9,374,787 B2 * | 6/2016 | de Lind van Wijngaarden .......... | H04W 52/0258 |
| 2002/0002578 A1 * | 1/2002 | Yamashita ............ | G06F 9/4862 718/105 |
| 2005/0033844 A1 * | 2/2005 | Andrzejak ............ | G06F 9/5066 709/226 |

(Continued)

FOREIGN PATENT DOCUMENTS

| | | |
|---|---|---|
| CN | 102243598 | 11/2011 |
| CN | 103703724 | 4/2014 |
| CN | 105471950 | 4/2016 |

OTHER PUBLICATIONS

Mace et al., "Retro: Targeted Resource Management in Multi-tenant Distributed Systems", Proceedings of the 12th USENIX Symposium on Networked Systems Design and Implementation (NSDI '15), USENIX Association, May 4-6, 2015, pp. 589-603.

(Continued)

*Primary Examiner* — Mehran Kamran
(74) *Attorney, Agent, or Firm* — Norton Rose Fulbright Canada LLP (57) ABSTRACT

The present disclosure is drawn to methods and systems for resource enforcement in a distributed system. At least one first host of the system has an enforcement agent configured to trigger a master enforcement controller in response to the first host running a task requiring access to a distributed resource. The master enforcement controller obtains identification information regarding the distributed resource and transmits an enforcement command to other hosts of the distributed system involved in providing the distributed resource. The enforcement command is received by enforcement agents on each of the involved hosts and triggers a slave enforcement controller on each of the involved hosts. The slave enforcement controllers locally enforce a resource quota for the distributed resource.

16 Claims, 5 Drawing Sheets

(56) References Cited

U.S. PATENT DOCUMENTS

| | | | | |
|---|---|---|---|---|
| 2005/0138175 A1* | 6/2005 | Kumar | G06F 9/468 | 709/226 |
| 2005/0193023 A1* | 9/2005 | Ismail | G06F 9/5016 | |
| 2005/5193023 | 9/2005 | Ismail | | |
| 2005/0235288 A1* | 10/2005 | Yamakabe | G06F 9/5072 | 718/100 |
| 2007/0106636 A1* | 5/2007 | Sridharan | G06F 11/004 | |
| 2007/0174839 A1* | 7/2007 | Takahashi | G06F 9/485 | 718/100 |
| 2009/0157928 A1* | 6/2009 | Riegebauer | H04L 12/403 | 710/110 |
| 2009/0234941 A1* | 9/2009 | Ammerlaan | G06F 9/505 | 709/224 |
| 2009/0300348 A1* | 12/2009 | Aciicmez | H04L 63/08 | 713/156 |
| 2009/0320029 A1* | 12/2009 | Kottomtharayil | G06F 9/505 | 718/102 |
| 2010/0119277 A1* | 5/2010 | Nakamichi | G03G 15/50 | 399/407 |
| 2010/0153542 A1* | 6/2010 | Arimilli | G06F 9/5088 | 709/224 |
| 2011/0002275 A1* | 1/2011 | Shousterman | H04W 16/06 | 370/329 |
| 2011/0106950 A1* | 5/2011 | Schlack | G06F 11/2046 | 709/226 |
| 2011/0255526 A1* | 10/2011 | Kaneko | H04B 7/022 | 370/338 |
| 2012/0084342 A1* | 4/2012 | Brown | H04N 21/2543 | 709/203 |
| 2012/0131367 A1* | 5/2012 | Kamijima | H02J 7/0021 | 713/323 |
| 2012/0174106 A1* | 7/2012 | Seo | G06F 9/485 | 718/100 |
| 2012/0235823 A1* | 9/2012 | Trock | G01R 31/3679 | 340/636.1 |
| 2012/0272237 A1* | 10/2012 | Baron | G06F 9/45558 | 718/1 |
| 2013/0061167 A1* | 3/2013 | Rhodes | G06F 11/349 | 715/781 |
| 2014/0029531 A1* | 1/2014 | Chang | H04W 16/14 | 370/329 |
| 2014/0208328 A1* | 7/2014 | Chen | G06F 9/485 | 718/103 |
| 2014/0282046 A1* | 9/2014 | Gonsalves | G06F 11/0709 | 715/740 |
| 2014/0304352 A1* | 10/2014 | Chaudhary | G06F 9/5011 | 709/208 |
| 2014/0325307 A1* | 10/2014 | Resch | G06F 11/1076 | 714/763 |
| 2015/0161157 A1* | 6/2015 | Ishizaki | H03M 7/30 | 707/693 |
| 2015/0195303 A1* | 7/2015 | Holden | H04L 63/1458 | 709/229 |
| 2015/0220363 A1* | 8/2015 | Cypher | G06F 9/50 | 718/104 |
| 2015/0222546 A1* | 8/2015 | Van Phan | H04W 36/0005 | 709/226 |
| 2015/0254108 A1* | 9/2015 | Kurtzman | G06F 9/5016 | 718/104 |
| 2015/0334696 A1* | 11/2015 | Gu | H04L 67/1095 | 718/1 |
| 2015/0347181 A1* | 12/2015 | Myrick | G06F 9/44594 | 718/102 |
| 2015/0363237 A1* | 12/2015 | Finnie | G06F 9/5016 | 718/104 |
| 2015/0378993 A1* | 12/2015 | Eisler | G06F 17/3007 | 707/827 |
| 2016/0055241 A1* | 2/2016 | Gower | G06F 17/30171 | 707/770 |
| 2016/0072917 A1* | 3/2016 | Huang | H04L 67/10 | 709/202 |
| 2016/0165087 A1* | 6/2016 | Okuda | H04N 1/00307 | 358/1.13 |
| 2016/0226250 A1* | 8/2016 | Fukubayashi | H02J 3/32 | |
| 2016/0226713 A1* | 8/2016 | Dellinger | H04L 41/12 | |
| 2016/0283366 A1* | 9/2016 | Nguyen Tien | G06F 12/0246 | |
| 2017/0303175 A1* | 10/2017 | Chen | H04W 36/04 | |

OTHER PUBLICATIONS

Van Do et al., "A Framework for Supporting the Bandwidth Enforcement of Reading from HDFS", Jul. 13, 2015, Analysis, Design and Development of ICT systems (AddICT) Laboratory, Budapest University of Technology and Economics, Hungary, 22 pages. http://www.hit.bme.hu/~dohoai/documents/HdfsTrafficControl.pdf.

* cited by examiner

DISTRIBUTED RESOURCE MANAGEMENT METHOD AND SYSTEM

TECHNICAL FIELD

The present description relates to a framework and architecture for managing resources in a distributed system.

BACKGROUND OF THE ART

Resource allocation in a computing system is the assignment of available resources to various uses. Resource management is the scheduling of activities and the resources required by those activities while taking into consideration resource availability and timing. Resource management includes resource allocation and resource enforcement, which is ensuring that resource allocation is respected.

Resource management in systems of distributed resources is challenging and therefore, improvements are desired.

SUMMARY

The present disclosure is drawn to methods and systems for resource enforcement in a distributed system. At least one first host of the system has an enforcement agent configured to trigger a master enforcement controller in response to the first host running a task requiring access to a distributed resource. The master enforcement controller obtains identification information regarding the distributed resource and transmits an enforcement command to other hosts of the distributed system involved in providing the distributed resource. The enforcement command is received by enforcement agents on each of the involved hosts and triggers a slave enforcement controller on each of the involved hosts. The slave enforcement controllers locally enforce a resource quota for the distributed resource.

In accordance with a broad aspect, there is provided a method for resource enforcement in a distributed system having a plurality of hosts. A master enforcement controller on a first host of the plurality of hosts is triggered in response to the first host accessing a distributed resource of the distributed system. Identification information regarding the distributed resource is obtained by the master enforcement controller. The master enforcement controller transmits an enforcement command including the identification information to at least one second host of the plurality of hosts, the at least one second host being associated with the distributed resource, the enforcement command configured for triggering a slave enforcement controller on the at least one second host for locally enforcing a resource quota.

In some embodiments, obtaining identification information comprises determining an accessing mechanism for the distributed resource. In some embodiments, obtaining identification information comprises identifying the at least one second host by determining which ones of the plurality of hosts are involved in providing the distributed resource.

In some embodiments, transmitting the enforcement command comprises transmitting to two or more hosts of the plurality of hosts.

In some embodiments, the enforcement command further comprises the resource quota for each of the two or more hosts.

In some embodiments, the method further comprises dynamically adjusting the resource quota based on access to the distributed resource by the first host. In some embodiments, dynamically adjusting the resource quota comprises setting different resource quotas for each of the two or more hosts.

In some embodiments, the method further comprises receiving the enforcement command from another one of the plurality of hosts of the distributed system; and triggering the slave enforcement controller on the first host.

In some embodiments, the enforcement command includes an adjusted resource quote.

In accordance with another aspect, there is provided a host in a distributed system having a plurality of hosts. The host comprises a processing unit and a non-transitory memory communicatively coupled to the processing unit. The memory comprises computer-readable program instructions executable by the processing unit for triggering a master enforcement controller on the host in response to the host accessing a distributed resource of the distributed system; obtaining, by the master enforcement controller, identification information regarding the distributed resource; and transmitting an enforcement command including the identification information to at least one other host of the plurality of hosts, the at least one other host being associated with the distributed resource, the enforcement command configured for triggering a slave enforcement controller on the at least one other host for locally enforcing a resource quota.

In some embodiments, obtaining identification information comprises determining an accessing mechanism for the distributed resource.

In some embodiments, obtaining identification information comprises identifying the at least one other host by determining which ones of the plurality of hosts are involved in providing the distributed resource.

In some embodiments, transmitting the enforcement command comprises transmitting to two or more hosts of the plurality of hosts.

In some embodiments, the enforcement command further comprises the resource quota for each of the two or more hosts.

In some embodiments, the processing unit is further executable for dynamically adjusting the resource quota based on access to the distributed resource by the host.

In some embodiments, dynamically adjusting the resource quota comprises setting different resource quotas for each of the two or more hosts.

In some embodiments, the processing unit is further executable for receiving the enforcement command from another one of the plurality of hosts of the distributed system; and triggering the slave enforcement controller on the host.

In some embodiments, the enforcement command includes an adjusted resource quote.

In accordance with another broad aspect, there is provided a distributed resource management system comprising a plurality of hosts, at least one of the plurality of hosts comprising an enforcement agent, the enforcement agent configured for locally triggering a master enforcement controller in response to access of a distributed resource by a corresponding host, the master enforcement controller configured for obtaining identification information regarding the distributed resource and transmitting an enforcement command with the identification information to at least one other host associated with the distributed resource, the enforcement agent also configured for locally triggering a slave enforcement controller upon receipt of the enforcement command from another one of the plurality of hosts, the slave enforcement controller configured for locally enforcing a resource quota.

In some embodiments, each one of the plurality of hosts comprise the enforcement configured for locally triggering the master enforcement controller and the slave enforcement controller.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
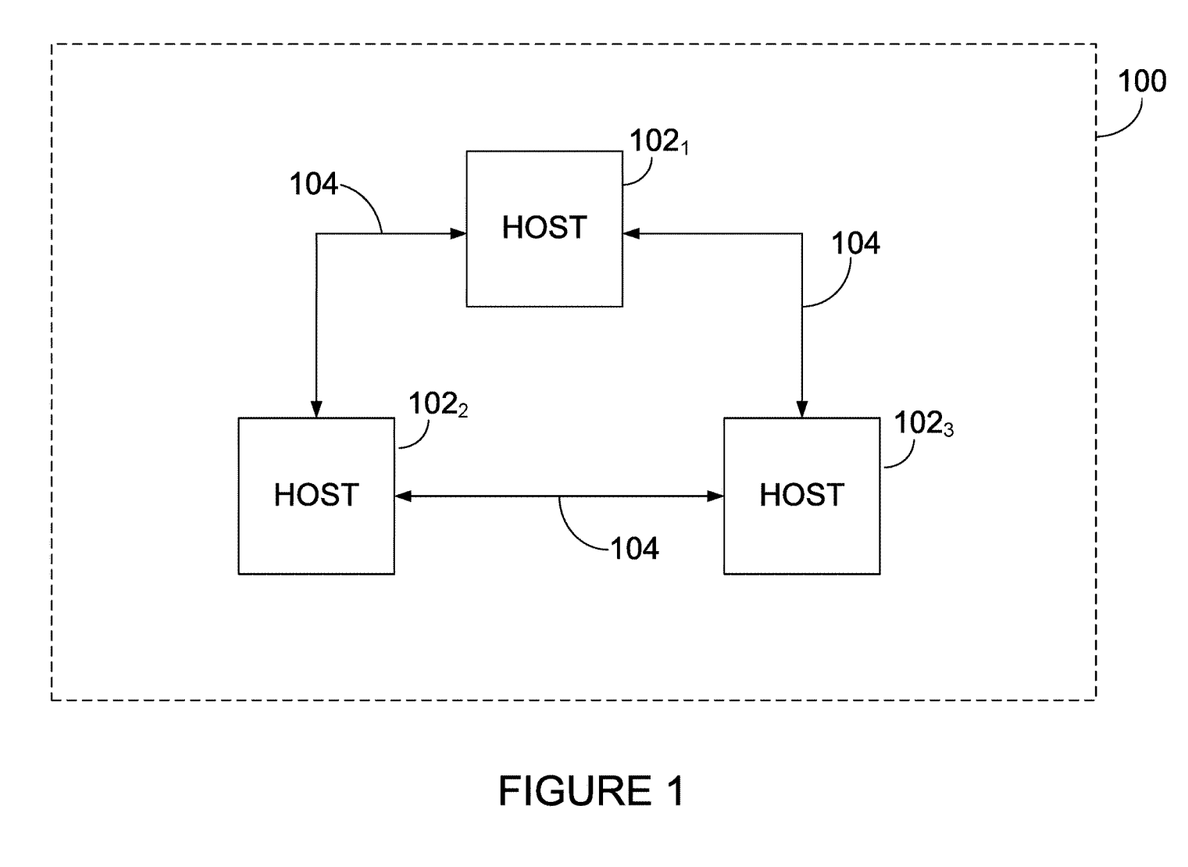
FIG. 1 is a block diagram of an example distributed system.

Referring to FIG. 1, there is illustrated a distributed system 100, comprising a plurality of hosts $102_1$, $102_2$, $102_3$ (collectively referred to as 102). The hosts 102 are hardware systems which either host an application task or host a distributed resource. The hosts 102 are interconnected and more than one of the hosts 102 has the ability to be operating at the same time. The hosts 102 can send data and messages to each other through communication links 104. The hosts 102 may be any one of one or more servers, one or more computers, one or more storage mediums, and one or more networks. The system 100 may be composed of different types of hosts. For example, host $102_1$ is a server, host $102_2$ is a computer, and host $102_3$ is a network of computers. Other combinations are also possible.

The system 100 can be arranged according to any one of the following architectures: host-based hierarchy, decentralized stand-alone, peer-to-peer Local Access Network (LAN)-based, hybrid enterprise-wide, client-server, and Internet-centric. At least one distributed service is provided across at least two of the hosts 102, and at least one of the hosts 102 can run a task. Examples of tasks are High Performance Computing (HPC) batch jobs, Message Passing Interface (MPI), serial batches, real-time analytics, elastic applications, long running services, virtual machines, and task containers. Examples of distributed resources are distributed file systems, virtualized file systems, distributed databases, virtualized networks, and distributed cache.

At least one first host $102_1$ of the plurality of hosts 102 in the distributed system 100 is configured for distributed resource enforcement across the system 100 when the first host $102_1$ runs a task that accesses a distributed resource. At least one second host $102_2$ of the plurality of hosts 102 in the distributed system 100 is configured for distributed resource enforcement across the system 100 when the first host $102_1$ accesses a distributed resource to which the second host $102_2$ is associated, i.e. the second host $102_2$ is involved in providing the distributed resource accessed by the first host $102_1$.

Figure 2:
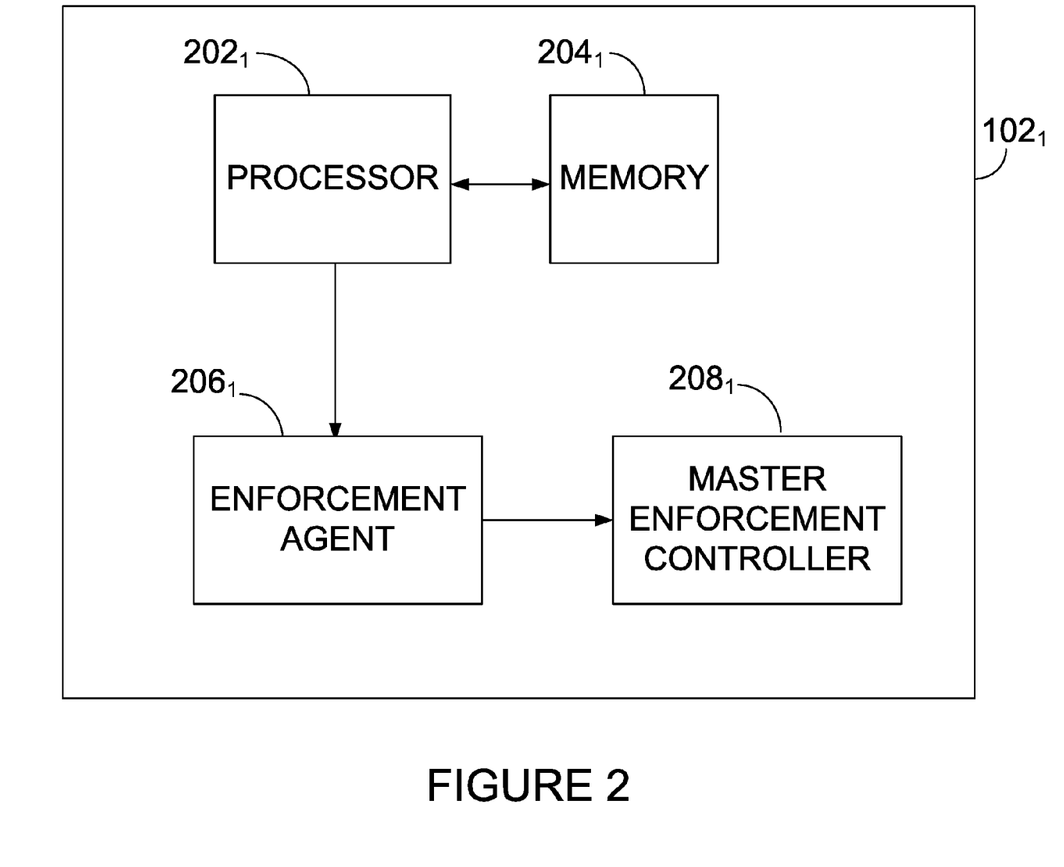
FIG. 2 is a block diagram of a first example host of the distributed system of FIG. 1.

FIG. 2 is an example embodiment of first host $102_1$, which accesses the distributed resource. Host $102_1$ includes a processor $202_1$ coupled to a memory $204_1$. Memory $204_1$, accessible by processor $202_1$, receives and stores data. Memory $204_1$ may be random-access memory (RAM), read-only memory (ROM), optical-disc-based read-only memory, electro-optical memory, magneto-optical memory, erasable programmable read-only memory (EPROM), electrically-erasable programmable read-only memory (EEPROM), Ferroelectric RAM (FRAM), and the like. Processor $202_1$ accesses the memory $204_1$ to retrieve data. Processor $202_1$ may be any device that can perform operations on data. Examples include any type of general-purpose microprocessor or microcontroller, a digital signal processing (DSP) processor, an integrated circuit, a field programmable gate array (FPGA), a reconfigurable processor, or any combination thereof. Memory $204_1$ has stored thereon computer-readable program instructions executable by processor $202_1$.

An enforcement agent $206_1$ is provided on first host $102_1$ and is operatively coupled to a master enforcement controller $208_1$. Enforcement agent $206_1$ may be running an application task and/or a distributed resource on first host $102_1$ and is configured to trigger master enforcement controller $208_1$ in response to the first host accessing a distributed resource of the system 100. Therefore, master enforcement controller $208_1$ is started by enforcement agent $206_1$ on first host $102_1$. Master enforcement controller $208_1$ obtains identification information regarding the distributed resource accessed by first host $102_1$. Master enforcement controller $208_1$ then transmits an enforcement command with the identification information to at least the second host $102_2$ in the distributed system 100. If additional ones of the plurality of hosts 102 are also associated with the accessed distributed resource, then the enforcement command is transmitted to all of the associated hosts 102.

Figure 3:
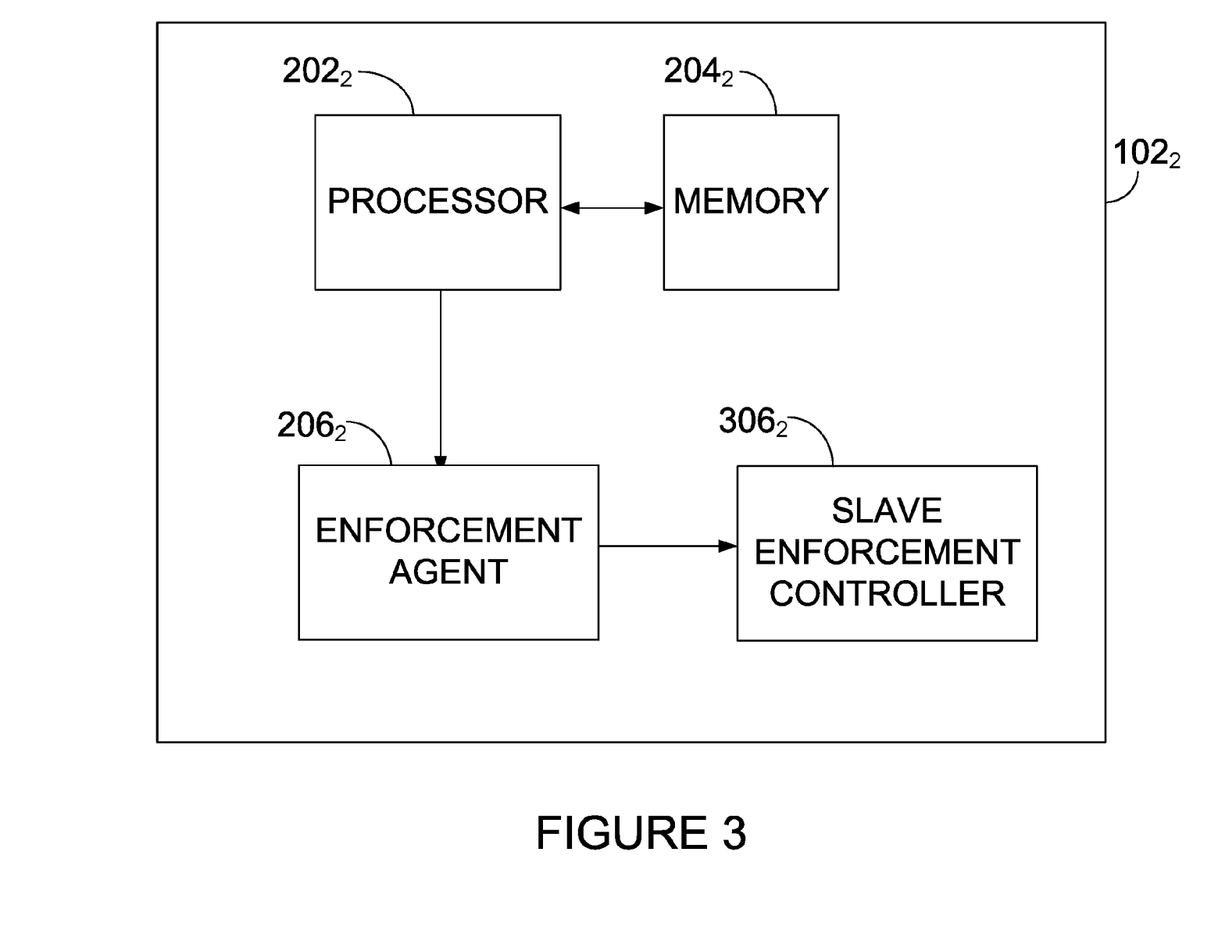
FIG. 3 is a block diagram of a second example host of the distributed system of FIG. 1.

FIG. 3 is an example embodiment of second host $102_2$, associated with the accessed distributed resource. Host $102_2$ includes a processor $202_2$ coupled to a memory $204_2$. Processor $202_2$ can access memory $204_2$ to store and retrieve data. Memory $204_2$ may be a main memory, such as a high speed Random Access Memory (RAM), or an auxiliary storage unit, such as a hard disk, a floppy disk, or a magnetic tape drive, or any combination thereof. Memory $204_2$ may be any other type of memory, such as a Read-Only Memory (ROM), or optical storage media such as a videodisc and a compact disc. Processor $202_2$ accesses memory $204_2$ to retrieve data. Processor $202_2$ may be any device that can perform operations on data. Examples are a central processing unit (CPU), a front-end processor, a microprocessor, and a network processor. Memory $204_2$ has stored thereon computer-readable program instructions executable by processor $202_2$. Note that processor $202_1$ and processor $202_2$ do not have to be the same type of processor. Similarly, memory $204_1$ and memory $204_2$ do not have to be the same type of memory.

An enforcement agent $206_2$ is provided on second host $102_2$ and is operatively coupled to a slave enforcement controller $306_2$. Enforcement agent $206_2$ runs the distributed resource accessed by first host $102_1$ and is configured to trigger slave enforcement controller $306_2$ in response to receipt of the enforcement command from first host $102_1$. Therefore, enforcement agent $206_2$ starts slave enforcement controller $306_2$ on second host $102_2$. Slave enforcement controller $306_2$ conducts local resource enforcement according to a resource quota.

The resource quota can be provided to second host $102_2$ by any one of the hosts 102 in the distributed system 100, or by another entity that acts as a master scheduler for setting an initial resource quota. In some embodiments, master enforcement controller $208_1$ is configured to dynamically adjust the resource quota based on access to the distributed resource by first host $102_1$. The adjusted resource quota is then transmitted from master enforcement controller $208_1$ to slave enforcement controller $306_2$, either as part of the identification information or separately therefrom. In some embodiments, the initial resource quota is transmitted from master enforcement controller $208_1$ to slave enforcement controller $306_2$, either as part of the identification information or separately therefrom, and the initial resource quota is iteratively adapted and retransmitted from master enforcement controller $208_1$ to slave enforcement controller $306_2$ as first host $102_1$ continues to perform the task involving access to the distributed resource.

When more than one of the hosts 102 is involved in providing the distributed resource, master enforcement controller $208_1$ transmits the enforcement command to each one of hosts 102 involved. The enforcement command will cause a local enforcement agent on each one of the involved hosts 102 to trigger a local slave enforcement controller. In some embodiments, master enforcement controller $208_1$ provides each one of the involved hosts 102 with a different resource quota, as a function of the specific needs of each involved host 102.

Figure 4:
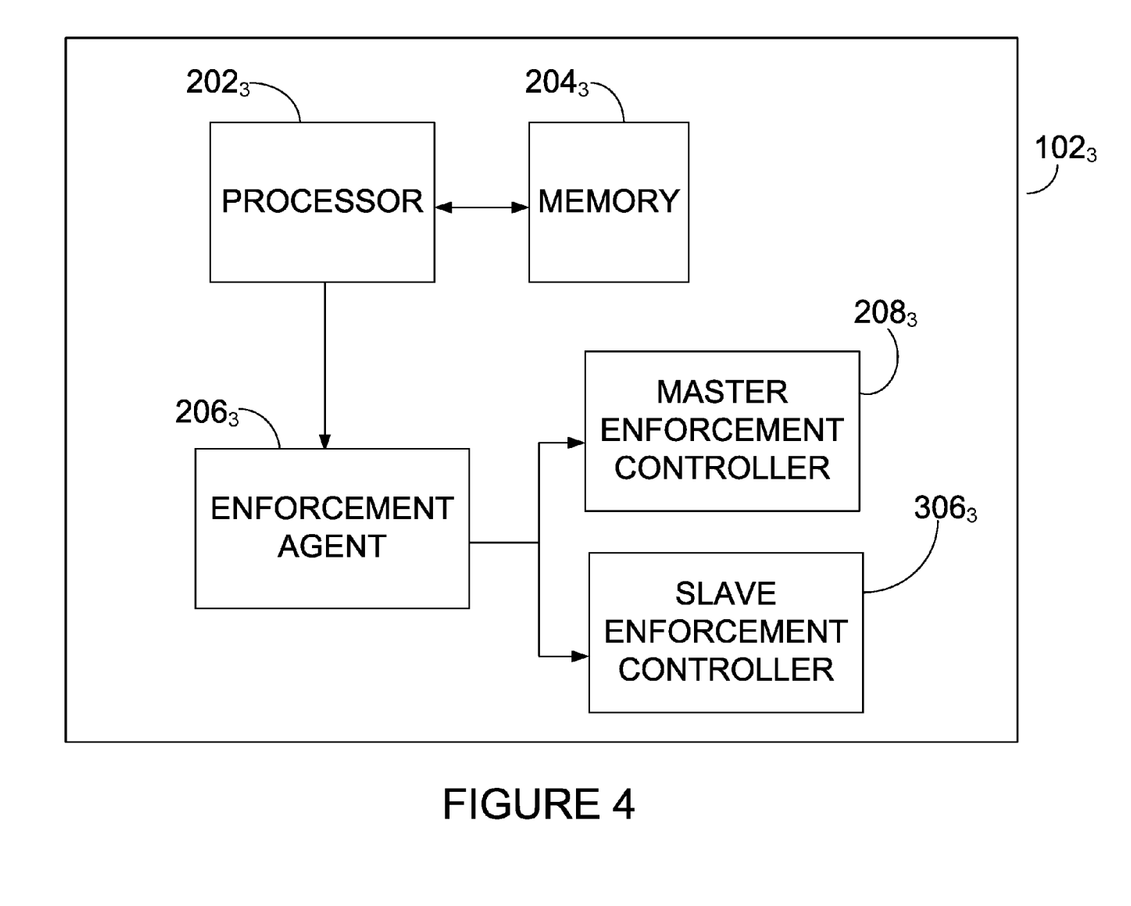
FIG. 4 is a block diagram of a third example host of the distributed system of FIG. 1.

In some embodiments, at least one host $102_3$ has an enforcement agent $206_3$ configured for selectively triggering a local master enforcement controller $208_3$ and a local slave enforcement controller $306_3$, as illustrated in FIG. 4. Master enforcement controller $208_3$ is triggered when host $102_3$ accesses a distributed resource of the system 100. Slave enforcement controller $306_3$ is triggered when an enforcement command is received from another one of the hosts 102, such as host $102_1$. Host $102_3$ can therefore become a master or a slave, depending on the activity in the distributed system 100. In some embodiments, all hosts 102 are configured to be both masters and slaves.

Figure 5:
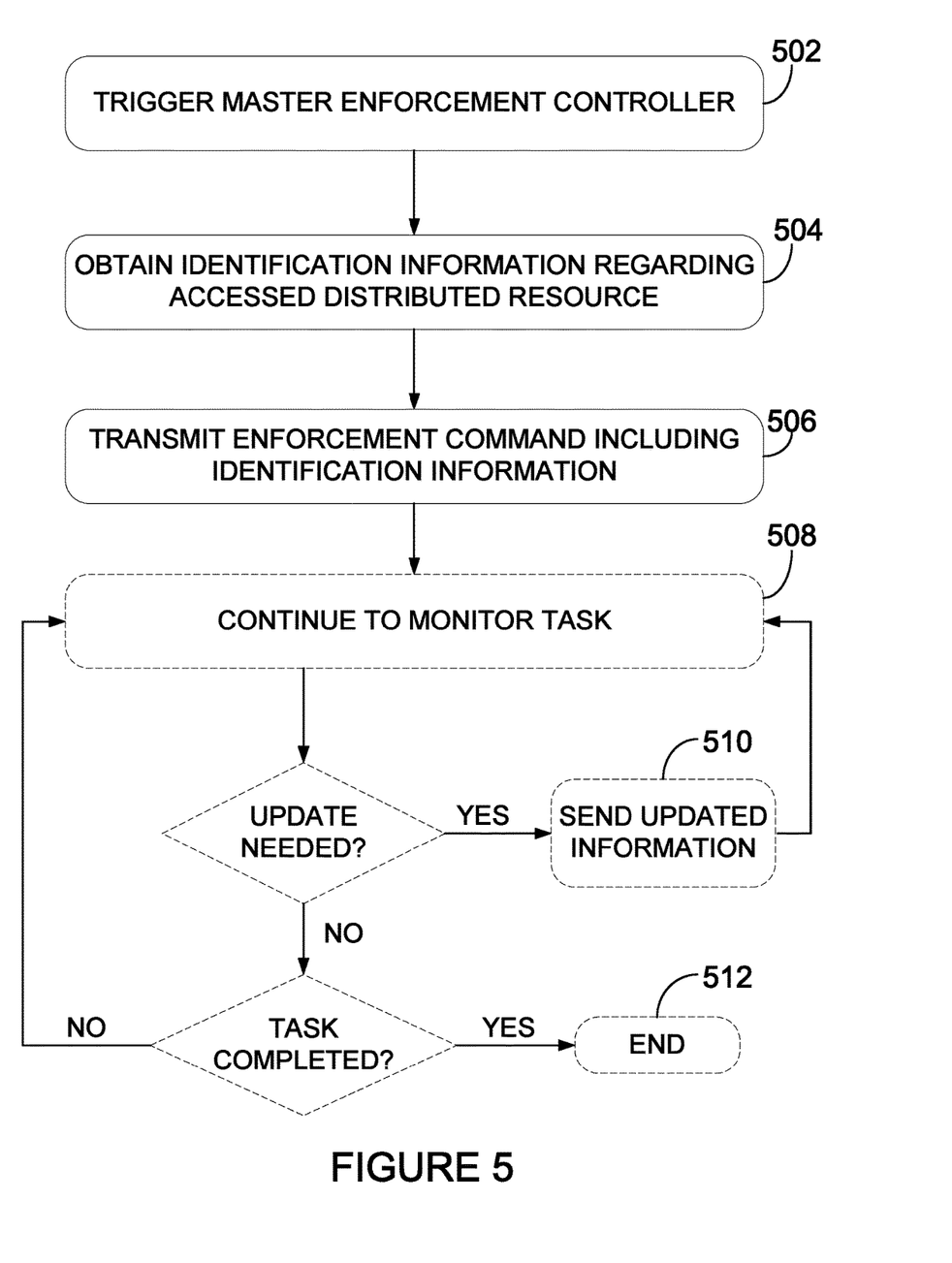
FIG. 5 is a flowchart of an example method for resource enforcement of the distributed system of FIG. 1.

Referring to FIG. 5, there is illustrated a method for resource enforcement of the distributed system 100, as performed, for example, by host $102_3$. At step 502, master enforcement controller $208_3$ is triggered on host $102_3$ in response to host $102_3$ running an access task that requires accessing a distributed resource of the system 100.

At step 504, identification information is obtained by master enforcement controller $208_3$ regarding the distributed resource. In some embodiments, obtaining the identification information involves identifying which distributed resource is to be accessed. For example, identification information such as Transmission Control Protocol (TCP) connections, Internet Protocol (IP) addresses, and Ports may be obtained. The access task may require access to multiple distributed resources. In some embodiments, obtaining the identification information also involves determining which ones of the hosts 102 are involved in providing the one or more distributed resources required by the access task. These may be identified by, for example, IP address. Identification information may include one or more of connections, flows, and/or requests between the distributed resource and the access task running on host $102_3$. In some embodiments, identification information includes process ID, connection socket ID, and port ID.

At step 506, the master enforcement controller $208_3$ transmits an enforcement command to other hosts 102 of the distributed system 100 in order to locally enforce, on each recipient host 102, a resource quota associated with the distributed resource. The enforcement command is sent to all hosts 102 involved in the one or more distributed resource required for the access task run by host $102_3$. The enforcement command includes the identification information obtained by the master enforcement controller $208_3$ in step 504, and is received by an enforcement agent of a corresponding host. The enforcement command is configured to trigger a slave enforcement controller on each corresponding host, for locally enforcing the resource quota. For example, local resource enforcement may involve limiting a corresponding TCP connection rate.

In some embodiments, the master enforcement controller $208_3$ continues to monitor the task performed by host $102_3$, as per step 508, and will send updated information to involved hosts 102 as required, as per step 510. For example, if the requirements regarding the distributed resource change, an adjusted resource quota is provided to each of the involved hosts 102.

The change in requirements may be detected by the master enforcement controller $208_3$ or by any of the slave enforcement controllers of corresponding hosts 102. Indeed, each slave enforcement controller can monitor connections, requests, flow status, and usage. For example, if host $102_1$ and host $102_2$ each enforce a connection flow rate of 45 MB/s for a target bandwidth of 90 MB/s, and the connection to host $102_2$ is terminated, slave enforcement controller $306_2$ detects the terminated connection and transmits the information to master enforcement controller $208_3$. Master enforcement controller $208_3$ can then adjust the resource quota of host $102_1$ to 90 MB/s. Alternatively, master enforcement controller $208_3$ detects the terminated connection and transmits an adjusted resource quota to host $102_1$. In some embodiments, an adjusted resource quota is transmitted from the master enforcement controller $208_3$ to one or more other hosts 102 for reasons other than a terminated connection.

In some embodiments, step 508 involves determining that a new distributed resource is needed for the access task. Sending updated information 510 then involves identifying any additional hosts 102 involved in the new distributed resource and triggering slave enforcement controllers on each of the additional hosts 102 by repeating steps 502, 504, 506.

When the access task is completed, the method proceeds to step 512 and ends.

Note that each one of the hosts 102 may have more than one master enforcement controller associated with an enforcement agent. The hosts 102 may also have more than one slave enforcement controller associated with an enforcement agent. For example, each task of host $102_3$ may be assigned one master enforcement controller and multiple slave controllers, so that when multiple tasks are running on host $102_3$, multiple enforcement controllers are also running on host $102_3$.

Each computer program described herein may be implemented in a high level procedural or object oriented programming or scripting language, or a combination thereof, to communicate with a computer system. Alternatively, the programs may be implemented in assembly or machine language. The language may be a compiled or interpreted language. Each such computer program may be stored on a storage media or a device, for example a ROM, a magnetic disk, an optical disc, a flash drive, or any other suitable storage media or device. The computer program may be readable by a general or special-purpose programmable computer for configuring and operating the computer when the storage media or device is read by the computer to perform the procedures described herein. Embodiments of the system may also be considered to be implemented by way of a non-transitory computer-readable storage medium having a computer program stored thereon. The computer program may comprise computer-readable instructions which cause a computer, or more specifically the at least one processing unit of the computer, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the present distributed system 100 may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The appended claims are to encompass within their scope all such changes and modifications.

The invention claimed is:

1. A method for distributed resource enforcement in a distributed computing system comprising a plurality of hosts, the method comprising:
in response to an enforcement agent, provided on a first host of the plurality of hosts, running a task that requires access to a distributed resource of the distributed computing system, designating a master enforcement controller to obtain identification information regarding the distributed resource, wherein at least two of the plurality of hosts are involved in providing the distributed resource and include the first host;
transmitting, from the master enforcement controller provided on the first host, a first enforcement command including the identification information to at least one host of the at least two of the plurality of hosts involved in providing the distributed resource, the first enforcement command starting a slave enforcement controller provided on the at least one host to locally enforce a resource quota for the at least one host;
receiving, at the master enforcement controller provided on the first host, a second enforcement command from another one of the plurality of hosts of the distributed computing system, the second enforcement command including an adjusted resource quota; and
in response to receipt of the second enforcement command, designating the slave enforcement controller provided on the first host to locally enforce the adjusted resource quota for the first host.

2. The method of claim 1, wherein the task comprises one of a High Performance Computing (HPC) batch job, a Message Passing Interface (MPI), a serial batch, real-time analytics, an elastic application, a long running service, a virtual machine, and a task container, and wherein the distributed resource comprises one of a distributed file system, a virtualized file system, a distributed database, a virtualized network, and a distributed cache.

3. The method of claim 2, wherein obtaining identification information comprises identifying the at least one host by determining which ones of the at least two of the plurality of hosts are involved in providing the distributed resource.

4. The method of claim 1, wherein transmitting the first enforcement command comprises transmitting the first enforcement command to two or more hosts of the at least two of the plurality of hosts.

5. The method of claim 4, wherein the first enforcement command further comprises the resource quota for each of the two or more hosts.

6. The method of claim 5, further comprising dynamically adjusting the resource quota based on access to the distributed resource by the first host.

7. The method of claim 6, wherein dynamically adjusting the resource quota comprises setting different resource quotas for each of the two or more hosts.

8. A host in a distributed computing system having a plurality of hosts, the host comprising:
a processing unit; and
a non-transitory memory communicatively coupled to the processing unit and comprising computer readable program instructions executable by the processing unit for:
in response to an enforcement agent, provided on a first host of the plurality of hosts, running a task that requires access to a distributed resource of the distributed computing system, designating a master enforcement controller to obtain identification information regarding the distributed resource, wherein at least two of the plurality of hosts are involved in providing the distributed resource and include the first host;
transmitting, from the master enforcement controller provided on the first host, an enforcement command including the identification information to at least one host of the at least two of the plurality of hosts involved in providing the distributed resource, the enforcement command starting a slave enforcement controller provided on the at least one host to locally enforce a resource quota for the at least one host;
receiving, at the master enforcement controller provided on the first host, a second enforcement command from another one of the plurality of hosts of the distributed computing system, the second enforcement command including an adjusted resource quota; and
in response to receipt of the second enforcement command, designating the slave enforcement controller provided on the first host to locally enforce the adjusted resource quota for the first host.

9. The host of claim 8, wherein the task comprises one of a High Performance Computing (HPC) batch job, a Message Passing Interface (MPI), a serial batch, real-time analytics, an elastic application, a long running service, a virtual machine, and a task container, and wherein the distributed resource comprises one of a distributed file system, a virtualized file system, a distributed database, a virtualized network, and a distributed cache.

10. The host of claim 9, wherein obtaining identification information comprises identifying the at least one host by determining which ones of the at least two of the plurality of hosts are involved in providing the distributed resource.

11. The host of claim 8, wherein transmitting the first enforcement command comprises transmitting the first enforcement command to two or more hosts of the at least two of the plurality of hosts.

12. The host of claim 11, wherein the first enforcement command further comprises the resource quota for each of the two or more hosts.

13. The host of claim 12, wherein the processing unit is further executable for dynamically adjusting the resource quota based on access to the distributed resource by the first host.

14. The host of claim 13, wherein dynamically adjusting the resource quota comprises setting different resource quotas for each of the two or more hosts.

15. A distributed computing system comprising a plurality of hosts, at least two of the plurality of hosts are involved in providing a distributed resource, at least one first host of the plurality of hosts running a task that requires access to the distributed resource and comprising an enforcement agent, the at least two of the plurality of hosts involved in providing the distributed resource including the at least one first host, the enforcement agent configured for locally designating a master enforcement controller on the at least one first host to obtain identification information regarding the distributed resource in response to the enforcement agent requiring access to the distributed resource and transmitting a first enforcement command with the identification information to the at least one host of the two of the plurality of hosts involved in providing the distributed resource, the first enforcement command designating a slave enforcement controller provided on the at least one host upon receipt of a second enforcement command including an adjusted resource quota from another one of the plurality of hosts to locally enforce the adjusted resource quota on the at least one host.

16. The distributed computing system of claim 15, wherein each one of the plurality of hosts comprise an enforcement agent configured for locally designating the master enforcement controller and the slave enforcement controller.

* * * * *